Jan. 11, 1949.   F. W. BAKER   2,458,761
VEHICLE ROAD WHEEL
Filed March 25, 1944   2 Sheets-Sheet 2
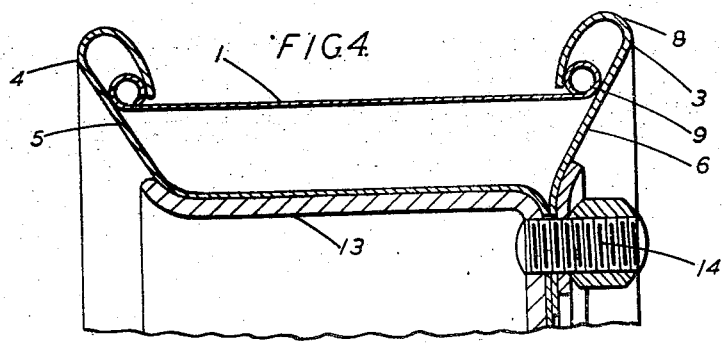
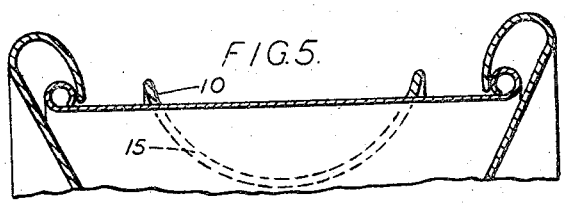
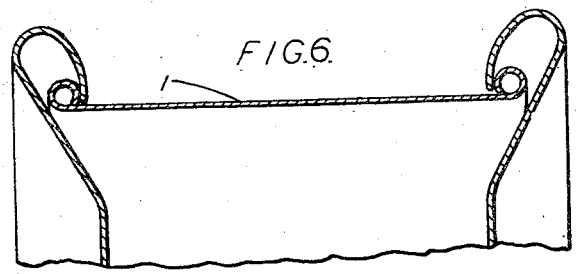
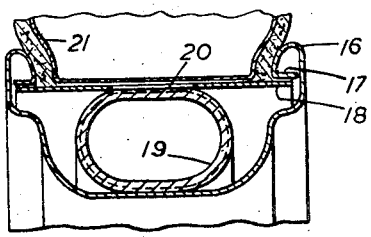 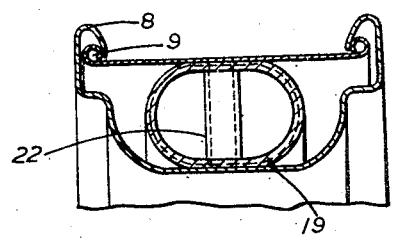
Inventor
Frederick W. Baker
By
William A. Davy
Attorney Patented Jan. 11, 1949

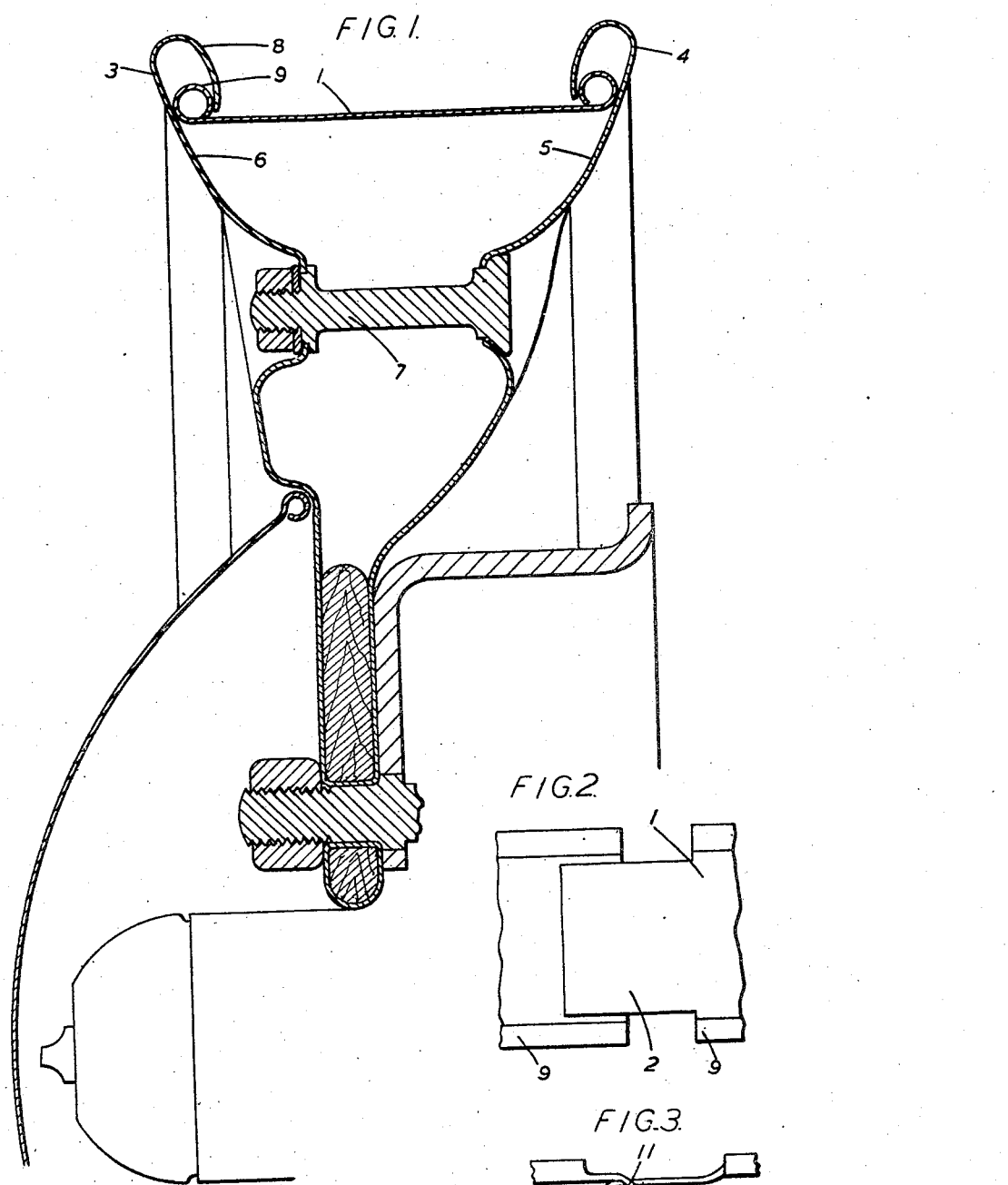

2,458,761

UNITED STATES PATENT OFFICE 2,458,761

VEHICLE ROAD WHEEL

Frederick William Baker, Oldswinford,
Stourbridge, England

Application March 25, 1944, Serial No. 528,104
In Great Britain March 25, 1943

7 Claims. (Cl. 152—5)

This invention relates to vehicle road wheels and/or rims and has for its object to provide resilience at the base or inner part of the tyre, to reduce as far as may be peripheral weight, and in some aspects to facilitate mounting or removal of the tyre.

Reference may be had to the accompanying drawings in which Figure 1 is a sectional elevation of a wheel according to the invention.

Figure 2 illustrates the overlapping ends of the enlargeable annulus included in Figure 1.

Figure 3 is another fragmentary view of one means for locking the annulus in enlarged condition, and to prevent possibility of creeping.

Figure 4 is a modification of the wheel illustrated in Figure 1.

Figure 5 depicts a modification having bead holding means.

Figure 6 shows a wheel with non-detachable side flange.

Figures 7 and 8 are sectional views of variations in which the annulus is enlarged by means of an inflatable tube.

The wheel may be constructed with a detachable side flange or it may be built with the two main portions incorporating the side flanges secured together non-detachably in any convenient manner, and may be secured to the hub by a number of spaced bolts or a central locking device.

In Figure 1 an arrangement is shown including a separable side flange which when assembled effects enlargement of the annulus. The annulus 1 consists of a thin metallic band capable of diametrical enlargement to a dimension where it functions as a seating for the beads of a pneumatic tyre or the equivalent inner parts of other types of tyre, or for contraction from the seating position. The ends of this split annulus may be shaped to slide one over the other during the process of expansion or contraction; in the latter case, as shown in Figure 2, a tongue 2 of reduced width is provided at one end of the band.

One convenient means for utilizing the assembling of the detachable side flange or member consists of an inclined plane or planes which when moved in one direction produces or produce a diametrical movement of the band in another direction. In Figure 1, the side members 3, 4 have near their periphery an inclined or curved portion 5, 6 for contact with the lateral edges of the band, which portions when caused relatively to approach by turning the nuts of the holding bolts 7 or by other means, effect enlargement of the band, or conversely when the nuts are slackened, the band contracts by its own resilience.

For mounting or changing a pneumatic tyre, the band can be removed from the wheel after the outer detachable flange is taken off, and the band inserted in the tube and cover for reassembly on the fixed flange. Tyre changing is thus materially facilitated.

To reduce peripheral weight and enhance the resilience of the band, I propose to make provision by which the band is laterally tensioned when in use. With these objects in view, means of engagement are provided for the flanges and band, and the lateral pressure in the air tube of a pneumatic tyre is transmitted via the tyre beads, the flanges and the means of engagement to the band wherein a lateral resulting pressure is set up. This taughtening or tensioning effect virtually integrates the structure, and also by allowing a light guage of metal to be used in the fabrication of the band, reduces the weight. Convenient means of engagement include a channel or trough section bead-contacting part 8 on each of the side members and an annular circular or other shaped projection 9 at each lateral edge of the band, arranged so that as the band is expanded, the projections engage and enter the channels. When the tyre is inflated, a relative opening motion of the side members occurs, firstly by yielding of the inturned part of one or both flanges, and secondly by yielding of one or both of the outer zones of the flanges, the latter motion being provided by spring loading the bolts 7 with steel springs or rubber, or by making the outer zones stiffer than the portions lying nearer the wheel centre. By supporting the band at its lateral edges without intermediate support, the band is resilient also to radial impacts and the base of the tyre is cushioned, shock absorption being augmented by the resilient character of the projections 9 and the side flange mounting.

If desired, the inner member carrying the brake drum may be fabricated of thicker metal than that of the detachable member and/or be fluted, corrugated or otherwise made stiffer.

To reduce the possibility of tyre or band creeping, the outside diameter of the band when fully expanded may be slightly oversize for the inside diameter of the tyre beads it is to be used with so that the beads are gripped tightly; though if desired, the band may be provided with two spaced peripheral projections 10 Figure 5 to fit the inner walls of the bead toes for pressure contact therewith.

Arrangements may be made to lock the band by coupling its ends together or otherwise when the band is fully enlarged e. g. by means of a bolt 11

Figure 3 transverse to the band and adapted to enter eyes 12 formed at the band ends in a manner similar to a butt hinge. The inner butt is constituted by the tongue 2, and the two outer eyes are formed from the ends of the projections 9. In this embodiment, the tongue 2 slides under instead of over, the opposite end of the band.

In Figure 4 is illustrated a variation in which the relatively fixed side member is mounted on the periphery of the inner wheel 13 where the tyre rim is detachable from the inner portion, and a single set of studs 14 is used for holding both side members in place and for drawing them together.

Dotted lines in Figure 5 indicate how a depression or well 15 may be formed circumferentially in the middle of the band to provide extra volume in the air tube of a pneumatic tyre. When this provision is incorporated as well as the projections 10 which support the beads in case of puncture or under inflation, the inner side walls of the parts 10 may form a continuation of the well 15.

An example of diametrical enlargement by means of an inflatable tube is depicted in Figure 7 wherein the rim 16 is widened at its base to form a shoulder 17 adjacent each flange against which shoulder the expandible band 18 is forced when the tube 19 is inflated, to constitute an elastic seating for the tyre beads or equivalent inner part or parts of the tyre. To provide co-operation of the two tubes, spaced holes 20 may be made in the band so that the periphery of the inner tube 19 may contact with the bore of the normal outer tube 21.

Figure 8 illustrates a combination of inflatable tube 19 for expanding, and engaging means 8, 9 on the flanges and band edges for inter-engagement and lateral tensioning of the band produced in the manner described in the description appertaining to Figure 1. A flexible rubber or similar sleeve 22 may be arranged to go through the inner tube for insertion of the valve stem of the outer tube.

Alternatively, the inner tube may be of the butt-ended type.

Having thus described my invention, what I claim is:

1. A vehicle wheel comprising a pair of side members which are spaced at their peripheries, means on said peripheries for laterally receiving the beads of a tire therebetween, an expansible annular band extending between said members, and means for expanding said band to seat its edges against said tire bead receiving means and to form a seat for the tire beads.

2. A vehicle wheel comprising a pair of side members which are spaced at their peripheries, means on the peripheries of said members for laterally receiving the beads of a tire therebetween, an expansible annular band extending between said members, and means resiliently supporting said band for expansion to seat its edges against said tire bead receiving means and to form a seat for the tire beads.

3. A vehicle wheel comprising a pair of side members having spaced relatively movable peripheral portions, means on the peripheries of said members for laterally receiving the beads of a tire therebetween, inclined portions on said members extending axially toward each other, an expansible annular band extending between said inclined portions, and means for moving said member peripheral portions relative to each other and varying the spacing of said inclined portions for expanding said band to seat its edges against said tire bead receiving means and to form a seat for the tire beads.

4. A vehicle wheel comprising a pair of flexible side members which are inclined in spaced relation toward their peripheries, means on the peripheries of said members for laterally receiving the beads of a tire therebetween, an expansible annular band between the inclined portions of said members, and means for flexing the spaced portions of said members relative to each other and varying the spacing of the inclined portions of said members for expanding said band to seat its edges against said peripheral means and to form a seat for the tire beads.

5. A vehicle wheel comprising, in combination, a hub portion, a pair of relatively movable discs forming the side members of the wheel and adapted for removable mounting to said hub portion, said discs being radially inclined in spaced relation toward their peripheries, means on the peripheries of said discs for laterally receiving the beads of a tire therebetween, an expansible annular band between the inclined portions of said discs, and means for removably securing said discs to said hub portion and for moving said discs relative to each other and varying the spacing of the inclined portions of said discs and expanding said band to seat its edges against said peripheral means and to form a seat for the tire beads.

6. A vehicle wheel comprising a pair of side members having spaced peripheral portions, tire bead receiving means supported on the peripheries of said side members for relative lateral movement under the inflation pressure of the tire, an expansible annulus between said side members and expandible for engagement with said means by its edges to form a seat for the tire beads, and means on the edges of said annulus for locking with said tire bead receiving means to limit the relative lateral movement of said latter means and laterally tension said annulus.

7. A vehicle wheel comprising a pair of side members having spaced peripheral portions, tire bead receiving channel portions with the channel openings toward the axis of the wheel and supported on the peripheries of said members for relative lateral movement under the inflation pressure of the tire, an expansible annulus between said side members and expandible for engagement by its edge portions with said channel portions to form a seat for the tire beads, and outwardly extending flanges on the edges of said annulus for seating within the channels of said tire bead receiving portions to limit the relative lateral movement of said portions and laterally tension said annulus.

FREDERICK WILLIAM BAKER.

REFERENCES CITED

The following references are of record in the file of this patent:

UNITED STATES PATENTS

| Number | Name | Date |
|--------|------|------|
| 607,043 | James | July 12, 1898 |
| 802,703 | Midgley | Oct. 24, 1905 |
| 1,049,287 | Barnett | Dec. 31, 1912 |
| 1,239,254 | Buckland | Sept. 4, 1917 |
| 1,715,890 | Baker | June 4, 1929 |

FOREIGN PATENTS

| Number | Country | Date |
|--------|---------|------|
| 403,163 | France | 1909 |